UNITED STATES PATENT OFFICE 2,477,087

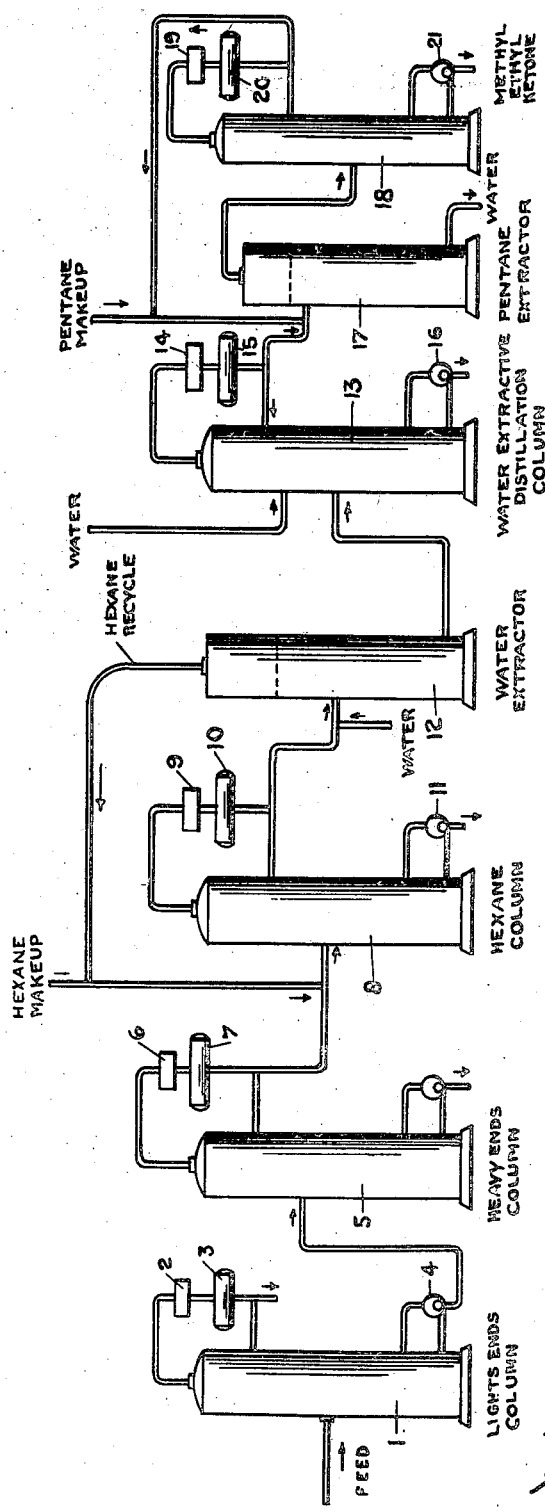

SEPARATION AND PURIFICATION OF
METHYL ETHYL KETONE

Nat C. Robertson, Corpus Christi, Tex., assignor to Celanese Corporation of America, a corporation of Delaware Application June 14, 1948, Serial No. 32,901

5 Claims. (Cl. 202—39.5)

This invention relates to the production of purified organic compounds and relates more particularly to the separation and purification of certain mixtures of organic compounds obtained as a product of the vapor phase partial oxidation, with air or oxygen, of gaseous hydrocarbons, such as propane, butane, or mixtures thereof.

An object of this invention is the provision of an improved process for the separation of purified methyl ethyl ketone and tetrahydrofuran from a crude fraction of the mixture of products obtained on the vapor phase partial oxidation, with air or oxygen, of gaseous aliphatic hydrocarbons such as, propane, butane, or mixtures thereof.

Other objects of this invention will appear from the following detailed description and the accompanying drawing.

In the drawing, the figure is a schematic diagram, or flow sheet, of apparatus employed in connection with my novel process.

The vapor phase, partial oxidation of aliphatic hydrocarbons such as propane or butane, or mixtures thereof, employing air or oxygen as the oxidizing agent, yields a complex mixture of products including formaldehyde, acetaldehyde, methanol, propionaldehyde, allyl alcohol, acetone, methyl ethyl ketone, methylal, acrolein, tetrahydrofuran, 2-methyl tetrahydrofuran, various oxides, methyl formate and other esters, formals and acetals, as well as numerous other aliphatic compounds in varying amounts. In order to separate the complex mixture of oxidation products and to purify each of the components so that the same will be suitable for commercial use, an intricate product purification scheme is necessary. Many of the oxidation products present in the mixture not only boil within a relatively narrow temperature range but numerous constant boiling azeotropes are also formed which makes an efficient and economical separation even more difficult. During the purification a number of crude fractions each containing a plurality of compounds is obtained. One such fraction comprises a mixture of tetrahydrofuran, 2-methyl tetrahydrofuran, methyl ethyl ketone, formals, acetals and oxides dissolved in pentane and obtained during an extractive distillation with pentane. The methyl ethyl ketone is present in the mixture, from which the pentane is stripped, in appreciable amount but the recovery of the same in a highly purified form from the mixture remaining after the pentane is stripped off is quite difficult. This is due to the fact that certain of the acetals tend to remain with the methyl ethyl ketone as contaminants since their solubilities and other physical characteristics are very similar.

I have now found that the methyl ethyl ketone may be separated from the aforementioned mixture, in which it is present together with tetrahydrofuran, 2-methyl-tetrahydrofuran and the several formals, acetals and oxides mentioned, in an efficient and economical manner and in a highly purified form. In accordance with my novel process, the desired separation may be effected if the fraction of said mixture boiling between about 68 and 75° C. is mixed with, say, 1 to 4 volumes of hexane and azeotropically distilled, the distillate comprising essentially a mixture of methyl ethyl ketone and hexane containing some acetals, and then separating the methyl and ethyl ketone from the distillate. This separation is effected by washing the distillate with water whereby the water-soluble methyl ethyl ketone is extracted together with at most about 5%, based on the weight of the methyl ethyl ketone, of acetals and then subjecting the aqueous extract to a water-extractive distillation which serves to remove the acetals. The distillate from the water extractive distillation comprises an azeotrope of methyl ethyl ketone and water. The methyl ethyl ketone present in the condensed azeotropic distillate is removed by extracting the latter with a water-immiscible solvent for the methyl ethyl ketone, such as pentane. On distillation of the pentane extract, the pentane comes over as the distillate and is recycled to the extractor where it is employed again for extracting the methyl ethyl ketone-water azeotrope. Purified methyl ethyl ketone is removed from the base of the pentane recovery still. The methyl ethyl ketone may be obtained in a purity of over 98% by my novel purification process.

In order further to illustrate the novel process of my invention, reference may be had to the accompanying drawing.

Referring now to the drawing, the crude feed free of pentane and comprising a mixture of methyl ethyl ketone, tetrahydrofuran, 2-methyl tetrahydrofuran, formals, acetals and oxides, is fed to a light ends column 1 provided with a condenser 2 and a receiver 3 and the fraction boiling below about 68° C. taken off. A side stream is continuously removed from the reboiler 4 of column 1 and passed to a heavy ends column 5 provided with a condenser 6 and a receiver 7. The fraction coming over up to about 75° C. is taken off in column 5, mixed with 1 to 4 volumes of hexane and the mixture fed to a hexane column 8. Column 8 is provided with a condenser 9 and a receiver 10. The fraction coming over up to about 65° C., and consisting of a mixture of hexane and methyl ethyl ketone, is taken off in column 8 and the residue in reboiler 11 is discarded. A side stream of the distillate from receiver 10 is taken off as shown, mixed with 4 to 8 volumes of water for each volume of the side stream and the mixture fed to a water extractor 12. The water acts to extract the methyl ethyl ketone from the hexane present and also removes the small amount of acetals from the solution. Since the water and hexane are immiscible two layers are formed in water extractor 12, the upper layer being hexane and the lower layer comprising an aqueous solution of methyl ethyl ketone. The hexane layer is recycled and the water extract continuously fed to a water-extractive distillation column 13 provided with a condenser 14 and a receiver 15. Water is also fed to the column in sufficient volume to maintain the equilibrium concentration of water in the column at from 50 to 80 volume per cent on each tray of the column. The large volume of water suppresses the acetals and the methyl ethyl ketone-water azeotrope formed is removed overhead. The acetals concentrate in reboiler 16 as an aqueous solution and may be discarded. The methyl ethyl ketone-water azeotrope taken off column 13 is then mixed with from 2 to 4 volumes of pentane and introduced into an extractor 17. The upper pentane layer which forms in the extractor contains the methyl ethyl ketone and is continuously removed and fed to a pentane recovery column 18 provided with a condenser 19 and a receiver 20. The pentane present comes off overhead and recycled to pentane extractor 17, while the purified methyl ethyl ketone is removed from reboiler 21 at the base of column 18.

It is to be understood that the foregoing detailed description may be given merely by way of illustration and that many variations may be made therein without departing from the spirit of my invention.

Having described my invention, what I desire to secure by Letters Patent is:

1. Process for the separation and purification of methyl ethyl ketone from a mixture comprising methyl ethyl ketone, tetrahydrofuran, 2-methyl tetrahydrofuran, formals, acetals and oxides, which comprises fractionating the mixture to separate therefrom a fraction boiling from about 68 to 75° C., mixing said fraction with hexane, distilling the mixture and separating a mixture of hexane and methyl ethyl ketone therefrom boiling up to about 65° C., washing the distillate with water to extract the methyl ethyl ketone, subjecting the aqueous extract to a water extractive distillation to wash the acetals therefrom and to distill off an azeotrope consisting of methyl ethyl ketone and water, extracting the azeotrope with pentane whereby the methyl ethyl ketone is removed and stripping the pentane from the methyl ethyl ketone to yield purified methyl ethyl ketone.

2. Process for the separation and purification of methyl ethyl ketone from a mixture comprising methyl ethyl ketone, tetrahydrofuran, 2-methyl tetrahydrofuran, formals, acetals and oxides, which comprises fractionating the mixture to separate therefrom a fraction boiling from about 68 to 75° C., mixing said fraction with hexane, distilling the mixture and separating therefrom a mixture of hexane and methyl ethyl ketone boiling up to about 65° C., washing the distillate with water to extract the methyl ethyl ketone, subjecting the aqueous extract to a water extractive distillation by introducing a large volume of water in the vapors so that the equilibrium concentration of water where the water is introduced is about 50–80 volume per cent to wash the acetals therefrom and to distill off an azeotrope consisting of methyl ethyl ketone and water, extracting the azeotrope with pentane whereby the methyl ethyl ketone is removed and stripping the pentane from the methyl ethyl ketone to yield purified methyl ethyl ketone.

3. Process for the separation and purification of methyl ethyl ketone from a mixture comprising methyl ethyl ketone, tetrahydrofuran, 2-methyl tetrahydrofuran, formals, acetals and oxides, which comprises fractionating the mixture to separate therefrom a fraction boiling from about 68 to 75° C., mixing said fraction with from about 1 to 4 volumes of hexane, distilling the mixture and separating therefrom a mixture of hexane and methyl ethyl ketone boiling up to about 65° C., washing the distillate with water to extract the methyl ethyl ketone, subjecting the aqueous extract to a water extractive distillation to wash the acetals therefrom and to distill off an azeotrope consisting of methyl ethyl ketone and water, extracting the azeotrope with pentane whereby the methyl ethyl ketone is removed and stripping the pentane from the methyl ethyl ketone to yield purified methyl ethyl ketone.

4. Process for the separation and purification of methyl ethyl ketone from a mixture comprising methyl ethyl ketone, tetrahydrofuran, 2-methyl tetrahydrofuran, formals, acetals and oxides, which comprises fractionating the mixture to separate therefrom a fraction boiling from about 68 to 75° C., mixing said fraction with from about 1 to 4 volumes of hexane, distilling the mixture and separating therefrom a mixture of hexane and methyl ethyl ketone boiling up to about 65° C., washing the distillate with water to extract the methyl ethyl ketone, subjecting the aqueous extract to a water extractive distillation by introducing a large volume of water into the vapors so that the equilibrium concentration of water where the water is introduced is about 80 volume per cent to wash the acetals therefrom and to distill off an azeotrope consisting of methyl ethyl ketone and water, extracting the azeotrope with pentane whereby the methyl ethyl ketone is removed and stripping the pentane from the methyl ethyl ketone to yield purified methyl ethyl ketone.

5. Process for the separation and purification of methyl ethyl ketone from a mixture comprising methyl ethyl ketone, tetrahydrofuran, 2-methyl tetrahydrofuran, formals, acetals and oxides, which comprises fractionating the mixture to separate therefrom a fraction boiling from about 68 to 75° C., mixing said fraction with from about 1 to 4 volumes of hexane, distilling the mixture and separating therefrom a mixture of hexane and methyl ethyl ketone boiling up to about 65° C., washing the distillate with water to extract the methyl ethyl ketone, subjecting the aqueous extract to a water extractive distillation by introducing a large volume of water into the vapors so that the equilibrium concentration of water where the water is introduced is about 80 volume per cent to wash the acetals therefrom and to distill off an azeotrope consisting of methyl ethyl ketone and water, extracting the azeotrope with from 2 to 4 volumes of pentane whereby the methyl ethyl ketone is removed and stripping the pentane from the methyl ethyl ketone to yield purified methyl ethyl ketone.

NAT C. ROBERTSON.

REFERENCES CITED

The following references are of record in the file of this patent:

UNITED STATES PATENTS

| Number | Name | Date |
|---|---|---|
| 2,381,032 | Bludworth | Aug. 7, 1945 |